United States Patent
Breternitz, Jr. et al.

(10) Patent No.: US 8,929,220 B2
(45) Date of Patent: Jan. 6, 2015

(54) PROCESSING SYSTEM USING VIRTUAL NETWORK INTERFACE CONTROLLER ADDRESSING AS FLOW CONTROL METADATA

(75) Inventors: Mauricio Breternitz, Jr., Austin, TX (US); Anton Chernoff, Littleton, MA (US); Mark D. Hummel, Franklin, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 148 days.

(21) Appl. No.: 13/593,707

(22) Filed: Aug. 24, 2012

(65) Prior Publication Data
US 2014/0056141 A1 Feb. 27, 2014

(51) Int. Cl.
*H04L 12/00* (2006.01)
*H04L 12/933* (2013.01)
*H04L 12/801* (2013.01)

(52) U.S. Cl.
CPC ............... *H04L 49/10* (2013.01); *H04L 47/10* (2013.01)
USPC .......................................... 370/235; 370/392

(58) Field of Classification Search
CPC ......... H04L 47/10; H04L 47/20; H04L 47/24; H04L 47/2441; H04L 47/2483; H04L 49/10
USPC ................................................. 370/235, 392
See application file for complete search history.

(56) References Cited

U.S. PATENT DOCUMENTS

| | | | |
|---|---|---|---|
| 6,456,593 B1 * | 9/2002 | Iverson et al. | 370/235.1 |
| 7,630,368 B2 | 12/2009 | Tripathi et al. | |
| 7,769,892 B2 * | 8/2010 | Arimilli et al. | 709/240 |
| 8,174,984 B2 * | 5/2012 | Tripathi et al. | 370/235 |
| 2005/0281196 A1 * | 12/2005 | Tornetta et al. | 370/235 |
| 2006/0250962 A1 * | 11/2006 | Chikamatsu | 370/235 |
| 2008/0239957 A1 * | 10/2008 | Tokura et al. | 370/235 |
| 2008/0273461 A1 * | 11/2008 | Liang et al. | 370/235 |
| 2011/0072179 A1 * | 3/2011 | Lacroute et al. | 710/244 |
| 2011/0225303 A1 * | 9/2011 | Engebretson | 709/227 |

OTHER PUBLICATIONS

Chowdhury et al., "Managing Data Transfers in Computer Clusters with Orchestra", SIGCOMM '11, Aug. 2011, 12 pages.
Wikipedia, "Network Virtualization", <<http://en.wikipedia.org/wiki/Network_virtualization>>, Accessed Aug. 24, 2012, 4 pages.

* cited by examiner

*Primary Examiner* — Min Jung (57) ABSTRACT

In a processing system comprising a plurality of processing nodes coupled via a switching fabric, a method includes implementing a flow control property for a data flow in the switching fabric based on an addressing property of an address of a virtual network interface controller associated with the data flow. A switching fabric includes a plurality of ports, each port coupleable to a corresponding processing node, and switching logic coupled to the plurality of ports. The switching fabric further includes flow control logic to implement a flow control property for a data flow in the switching logic based on an addressing property of an address of a virtual network interface controller associated with the data flow.

27 Claims, 5 Drawing Sheets

PROCESSING SYSTEM USING VIRTUAL NETWORK INTERFACE CONTROLLER ADDRESSING AS FLOW CONTROL METADATA

BACKGROUND

1. Field of the Disclosure

The present disclosure generally relates to multiple-node processing systems and, more particularly, to control of data flows between nodes in a multiple-node processing system.

2. Description of the Related Art

A network aggregation switch device, or switching fabric, typically is used to control the transfer of incoming and outgoing data flows between ingress and egress ports of processing nodes in a computing system, such as a network, server or clustered computing device. The switching fabric often can implement various flow control mechanisms fobr data flows by modifying the switching fabric protocol to include additional fields so as to include extra "piggy-back" flow control information in these additional fields. However, many switching fabrics are architected to implement industry-standard protocols, such as an Ethernet protocol, an Internet Protocol (IP), or an Infiniband protocol, and the modifications to include extra fields to carry flow control information require non-standard protocol extensions, and thus incur additional cost in development and validation of the software interfaces required to implement such non-standard protocol extensions.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate example techniques for controlling a data flow communicated via a switching fabric in a multiple-node processing system by using the address of a virtual network interface controller (VNIC) instantiated for the data flow as metadata reflective of one or more flow control properties to be applied to the flow. In at least one embodiment, a processing node instantiates a VNIC in association with a data flow and selects an address for the VNIC that has an addressing property that is associated with a flow control property that the processing node wants applied to the data flow, and assigns this selected address to the instantiated VNIC. To illustrate, the system may be configured such that even addresses are treated in accordance with one flow control property, whereas odd addresses are treated in accordance with another flow control property. As each packet in the data flow is received at a port of the switching fabric, the switching fabric identifies the packet as having an address with the addressing property, and thus applies the corresponding flow control property while handling the packet. Under this approach, the addresses used in a data flow can be selected for one or both of the source and destination VNICs so as to act as both addressing information and flow control metadata used by the switching fabric to control the data flow. As this approach does not require additional fields in the packets or other extensions to the protocol implemented by the switching fabric to convey flow control information, the switching fabric can remain compatible with established standard protocols.

Figure 1:
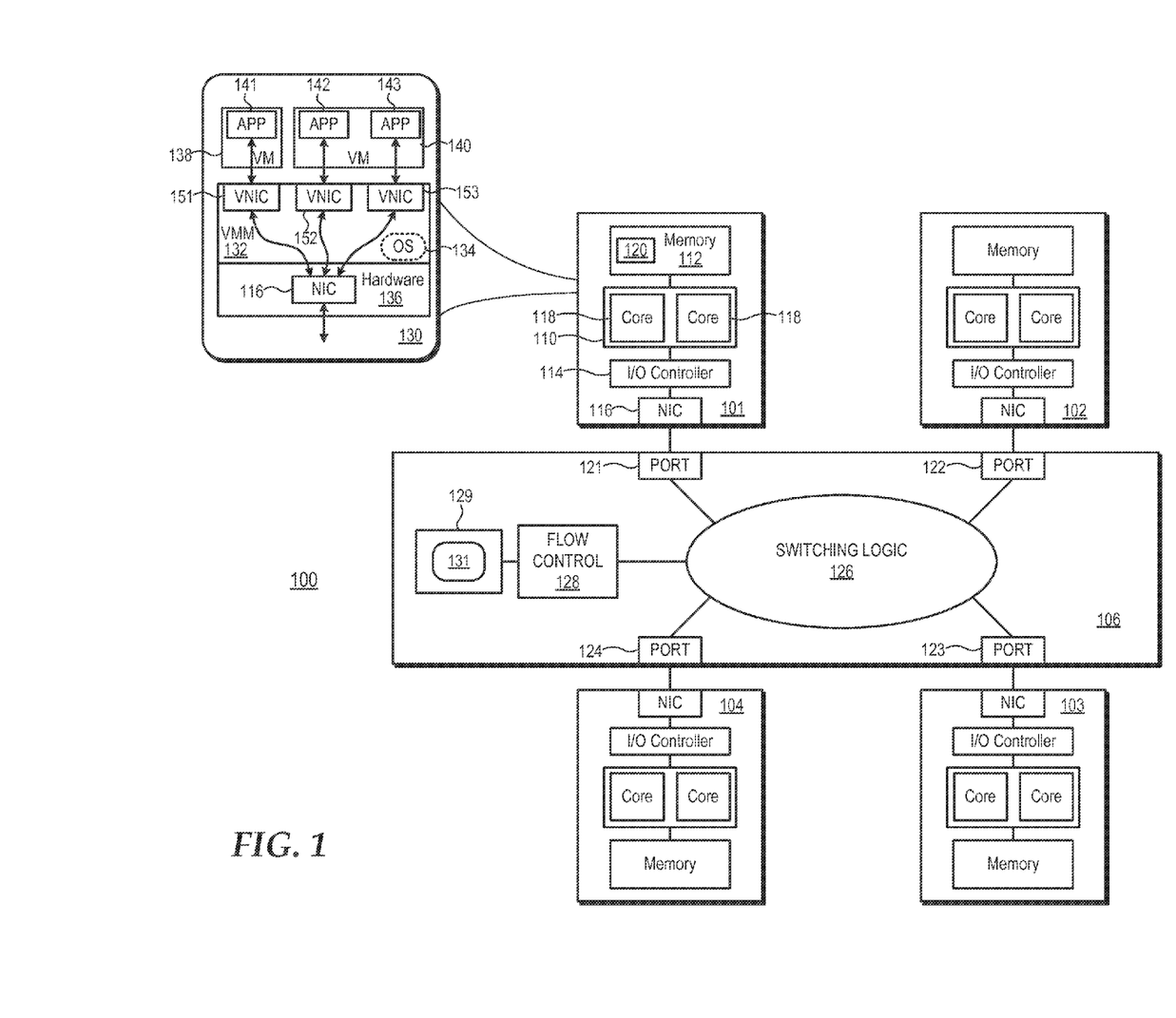
FIG. 1 is a block diagram of a multiple-node processing system employing network interface address-based flow control in accordance with at least one embodiment of the present disclosure.

FIG. 1 illustrates a multiple-node processing system 100 employing VNIC addressing as flow control metadata in accordance with at least one embodiment of the present disclosure. In the depicted example, the processing system 100 comprises a plurality of processing nodes, such as processing nodes 101, 102, 103, and 104, coupled via switching fabric 106. As described below, the processing nodes can be implemented as, for example, server blades or other types of field replaceable units (FRUs) and the switching fabric 106 can be implemented as an interconnect coupled to the FRUs.

Each of the processing nodes can include one or more processors 110, a memory 112, an input/output controller 114 (e.g., a southbridge), and a network interface controller (NIC) 116, as well as other peripheral components to support the operation of the processing node. Each processor 110 comprises one or more processor cores 118, which can include any of a variety of types of processor cores and combinations thereof, such as a central processing unit (CPU) core, a graphics processing unit (GPU) core, a digital signal processor (DSP), and the like. The memory 112 can include system random access memory (RAM), flash memory, cache, register files, disc storage, and the like, and can store software 120, which can include executable instructions to manipulate the processing node to perform certain functionality described herein.

The switching fabric 106 can comprise any of a variety of switching fabric architectures to provide a mesh of point-to-point links between the processing nodes of the processing system 100. In a tightly-integrated implementation of the processing system 100, such as implementation of the processing system as within a server blade or server rack, such architectures can include Peripheral Component Interconnect Express (PCIe) architectures, HyperTransport architectures, QuickPath Interconnect (QPI) architectures, Infiniband architectures, Fiber Channel architectures, and the like. In more dispersed implementations, such as a network aggregation of processing resources, the switching fabric architecture can include, for example, one or more Layer 2 or Layer 3 switches or routers implementing one or more of a media access control (MAC) protocol, an Ethernet protocol, and a Telecorammunications Protocol/Internet Protocol (TCP/IP).

Alternatively, the switching fabric 106 can be implemented in accordance with a proprietary switching fabric architecture, or with a combination of switching fabric architectures, such as a combination of Ethernet and Infiniband architectures.

In the example of FIG. 1, the switching fabric 106 includes one or more ports for the NIC 116 of each of the processing nodes, such as ports 121, 122, 123, and 124 for processing nodes 102-104, respectively, and switching logic 126 to implement the links between the ports. Although FIG. 1 depicts an implementation whereby each processing node has one corresponding port, in other implementations the switching fabric 106 may implement multiple ports per processing node, such as one or more ingress ports and one or more egress ports per processing node. The switching logic 126 can include one or more switching devices to provide the point-to-point links between the ports of the switching fabric 106. The switching fabric 106 further includes flow control logic 128 to manage the switching logic 126 to establish links between the ports to route packet flows between ports and to implement various flow control mechanisms for the packet flows. Note that the term "packet" is intended to refer broadly to any of a variety of datagram formats, including a packet (e.g., an IP packet), a frame (e.g., an Ethernet frame), and the like. As described in greater detail herein, the flow control logic 128 has access to a data store 129 (e.g., a register file, cache, RAM, read only memory (ROM), flash memory, and the like) that stores flow control information in a data structure 131, such as one or more tables or lists, that identifies a specified mapping between address properties and flow control properties, as described below.

In at least one embodiment, the processing nodes implement virtualization of the NIC 116 so that multiple virtual NICs (VNIC(s)) may be instantiated for the same physical implementation of the NIC 116. As shown by view 130, a virtual machine manager (VMM) 132 may be implemented by, or in conjunction with, an operating system (OS) 134 to virtualize components of the hardware 136 of the processing node (including the NIC 116) so as to support one or more virtual machines (VMs) at the processing node. Each VM may execute one or more low-level applications (e.g., driver applications) or high-level applications (e.g., a guest OS or a user-level application), some or all of which may be involved in one or more data flows with other applications on other processing nodes. For example, the processing node 101 may support VMs 138 and 140, whereby VM 138 has an application 141 communicating with other processing nodes via one data flow and VM 140 has applications 142 and 143 communicating with other processing nodes via corresponding data flows.

To facilitate network communications for the virtual machines of a processing node, the VMM 132 (or a virtual machine) can instantiate multiple VNICs to emulate the physical NIC 116. A VNIC may be instantiated on a per-VM basis, on a per-application basis, or on a per-data flow basis. For example, the VMM 132 may instantiate VNICs 151, 152, and 153 for the data flows of the applications 141, 142, and 143, respectively. The instantiated VNIC typically is a software-manifested interface between the physical NIC 116 and the VMs or their applications, whereby each VTIC is assigned its own unique address (e.g., a MAC address or an IP address depending on the protocol of the switching fabric 106) and the VMM 132 implements driver software to act as a bridge between the physical NIC 116 and the VMs. Data from a VM is packetized by the corresponding VNIC (including the address of the VNIC as the source address), and the resulting packets are provided by the VNIC/VMM to the physical NIC 116 for transmission. Conversely, packets having the address of the VNIC as the destination address are intercepted by the VMM from the NIC 116, depacketized by the VNIC/VMM, and the resulting data payloads of the packets are supplied to the corresponding VM. Alternatively, in a direct-attach implementation of the VNIC, the VM can bypass the VMM and communicate directly with the switching fabric 106 via the physical NIC 116. Under either of these approaches, each VNIC appears on the corresponding port of the switching fabric 106 as indistinguishable from a physical NIC. Thus, the instantiation of a VNIC typically includes the assignment of various virtual parameters that reflect the parameters that would be assigned to a physical NIC, such as a virtual address (e.g., MAC or IP address), one or more virtual input/output (I/O) ports, an interrupt request (IRQ) channel number, and the like.

In at least one embodiment, the processing system 100 leverages the instantiation of the VNICs to not only to provide support for separate data flows between nodes, but to implement certain flow control properties for the data flows. In particular, the processing nodes use the addresses assigned to the instantiated VNICs as flow control metadata to signal one or more flow control properties to be applied to the data flows transmitted or received by the VNICs. Certain flow control properties are assigned to corresponding addressing properties, and a processing node may arrange for a particular flow control property to be applied to a data flow by selecting and assigning to the VNIC instantiated for the data flow an address that has an addressing property mapped to or otherwise associated with the desired flow control property. To illustrate by way of an example, the processing system 100 may implement prioritization of data flows (one embodiment of a flow control property), and a high priority data flow may be signaled by assigning odd addresses to one more of the VNICs associated with the data flow. Conversely, a low priority data flow may be signaled by assigning even addresses to one or more of the VNICs associated with the data flow. Thus, in this example, the addressing property of being an "even address" is assigned to a low-prioritization flow control property, and the addressing property of being an "odd address" is assigned to a high-prioritization flow control property.

Example flow control properties that may be signaled as address metadata include, but are not limited to, flow prioritization, packet replication, Quality of Service (QoS), a virtual subnet number, and the like. Flow prioritization can include assigning a priority designator to indicate which priority buffers or queues packets are to be stored in while traversing the link between ingress and egress ports, the priority of the packets with respect to packet dropping mechanisms or other congestion control mechanisms, and the like. Packet replication can include the duplication of a packet such that multiple copies of a packet are transmitted over separate links, thereby increasing the likelihood that the destination receives the packet. QoS flow control properties can include, for example, the association of a data flow to a high-reliability link, a low-latency link, high-throughput link, or the specification of a maximum allowable error rate or maximum allowable jitter.

In at least one embodiment, the addressing property comprises one or more numerical attributes of one or more of the various digits of the address in some radix of representation (e.g., binary, octal, decimal, hexadecimal, and the like.) Example addressing properties that may be used include, but are not limited to, even/odd addressing, a parity of the address or of some part of the address, a sum operation, OR operation, AND operation, a hash operation, or other arithmetic or logical operation performed using the digits at one or more numerical positions of the address, a specific digit or set of digits at a subset of the address (e.g., digits "aa" for the last octet of the address), and the like. Table 1 illustrates an example mapping between addressing properties and flow control properties.

TABLE 1

Example Flow Control Property/Addressing Property Mapping

| Flow Control Property | Addressing Property Assigned |
|---|---|
| High Priority Flow | Even Address |
| Low Priority Flow | Odd Address |
| Replication On | Parity value = 0 |
| Replication Off | Parity value = 1 |
| Assign Low Latency Link | Even Address & sum of second and third octets of address <128 |
| Assign High Throughput Link | Odd Address & third octet of address = 7 |

In one embodiment, each processing node of the processing system 100 locally maintains a copy of the data structure 129 of the flow control information (identifying the mapping of addressing properties to corresponding flow control properties) as, for example, a look up table (LUT). Accordingly, when instantiating a VNIC to support a data flow, the processing node can identify one or more flow control properties for implementation for the data flow by performing a lookup operation to the LUT and then select for, and assign to, the VNIC an address that has the addressing properties associated with the identified flow control properties. In certain instances, flow control properties may be assigned to addressing properties in a way that an address can have addressing properties that are assigned to flow control properties that are mutually exclusive to one another or otherwise conflict. For example, a processing node, intending to provide for a high throughput link for a data flow, may select an address having both the address property associated with the intended high throughput link property, as well as inadvertently having an address property associated with an unintended low priority flow control property. Accordingly, the processing nodes may need exhibit the appropriate care when selecting an address. In another embodiment, rather than determine the address at the processing node, the processing node instead presents one or more desired flow control properties to the flow control logic 128 of the switching fabric 106 using an agreed-upon convention (not shown), and it is the flow control logic 128 that then selects and assigns an appropriate address for the VNIC and communicates the selected address back to the processing node.

The flow control logic 128 of the switching fabric 106 likewise locally maintains the data structure 131 of addressing property/flow control property mappings, such as in the local data store 129. When receiving a packet for a flow from a port, the flow control logic 128 analyzes one or both of the source address or the destination address to identify which addressing properties are exhibited by the analyzed address or addresses. The flow control logic 128 then determines, from the data structure 131, the flow control properties assigned to the exhibited addressing properties, and configures the switching logic 126 to implement the determined flow control properties for the packet accordingly. The flow control logic 128 may perform this analysis on each packet received, or the flow control logic 128 may set up the flow control mechanisms identified for a data flow from a first packet of the flow for all subsequent packets from the same flow (that is, having the same source address or destination address, or both).

By selecting and implementing an address for a VNIC based on a predetermined association of addressing properties and flow control properties, the address of the VNIC acts as both address information (that is, information identifying the source or destination) and metadata reflecting the flow control properties to be applied to the data flow. As this metadata is embedded in, or part of, the source or destination address of the packets, the processing nodes can signal flow control properties for data flows to the switching fabric 106 and the other processing nodes without introducing an extension or other modification to the underlying standard protocol used by the switching fabric 106, and without necessarily impacting standard and legacy software interfaces.

Figure 2:
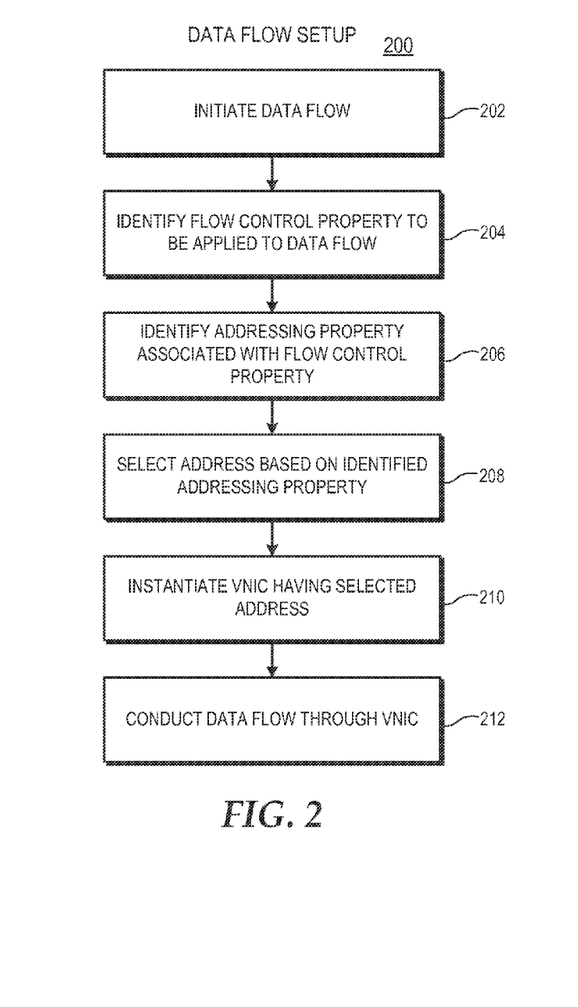
FIG. 2 is a flow diagram illustrating a method for setting up flow-control properties for a data flow through flow metadata represented by selected network interface addressing in accordance with at least one embodiment of the present disclosure.

FIG. 2 illustrates a method 200 for setting up a data flow using address-indicated flow control metadata in accordance with at least one embodiment of the present disclosure. For ease of description, the method 200 is described in the context of the processing system 100 of FIG. 1 and in an example context in which a VMM implements one or both of the transport layer or network layer. The method 200 initiates at block 202, whereupon an application at a processing node in the processing system 100 initiates a data flow that is to be transmitted between two or more processing nodes of the processing system 100. At block 204, the one or more flow control properties to be applied to the data flow are identified. In one embodiment, the application initiating the data flow signals the one or more flow control properties. For example, the application may identify the data flow as high priority or needing a particular QoS attribute. In another embodiment, a lower layer of the network protocol stack may identify the flow control properties to be applied by, for example, analyzing the type of data flow or the content of the data flow. For example, the data flow could represent a stream of encoded graphics data from one processing node to a decoder application at another processing node, and thus the transport layer or network layer (implemented by, for example, the VMM 132) may assign a high-throughput flow control property to the data flow. Other embodiments may use other algorithms for determining the flow control properties to be applied to the data flow.

Continuing with an example wherein the VMM 132 implements the transport layer or the network layer, at block 206 the VMM 132 accesses the data structure 131 from local data store 129 and identifies the addressing property mapped to each flow control property identified at block 204, and at block 208 the VMM 132 selects an address exhibiting the one or more identified addressing properties. In the event that there is a conflict between the addressing property mapped to one identified flow control property and the addressing property mapped to another identified flow control property, the VMM 132 may choose to rank the flow control properties involved in the conflict and disregard the lower-ranked flow control property.

At block 210, the VMM 132 (or a VM associated with the application) instantiates a VNIC for the physical NIC 116 of the processing node so as to handle the data flow and assigns the address selected at block 208 to the VNIC such that the packets of the data flow handled by the instantiated VNIC will have the address with the flow control property metadata reflected by particular address properties of the address. Accordingly, at block 212, the instantiated VNIC conducts the data flow by packetizing data to be transmitted, inserting the address as the source address of each packet generated for the data flow, and providing the packet to the corresponding port of the switching fabric 106 for transmission to one or more other ports of the switching fabric 106.

Although the description of the method 200 above focuses on an example implementation whereby the source address of packets are used as flow control metadata for the packets, in other embodiments the destination address of the packets may be used as flow control metadata instead of, or in addition to, the source address. To illustrate, a virtual machine receiving a data flow may instantiate a VNIC with an address selected to provide certain flow control properties for the data flow independent of the transmitting application/transmitting VNIC. As such, the switching fabric 106 may look to either the source address or destination address of a data flow in order to determine the flow control mechanisms to be applied to the packet. Moreover, the flow control properties for a data flow may be indicated by both the source address and the destination address. To illustrate, the processing system 100 may be configured such that a flow control mechanism is implemented for a data flow only when both the source address (the address of the transmitting VNIC) and the destination address (the address of the receiving VNIC) have the addressing property mapped to the flow control mechanism. In another embodiment, the flow control properties indicated by the address metadata may be additive such that both the flow control mechanisms indicated by the addressing properties of the source address and the flow control mechanisms indicated by the addressing properties of the destination address are implemented for the data flow. In the event that there is a conflict between the flow control properties corresponding to the addressing properties mapped to the source address and the flow control properties corresponding to the addressing properties mapped to destination address, the switching fabric 106 may choose to rank the flow control properties involved in the conflict and disregard the lower-ranked flow control properties.

Moreover, as noted above, rather than have a processing node select the address to be assigned to a VNIC based on the desired flow control properties as described above, in an alternative embodiment, the processing node instead can present an indicator of the one or more desired flow control properties using some agreed-upon convention to the flow control logic 128, which then selects and assigns an appropriate address for the VNIC and communicates that address back to the processing node.

Figure 3:
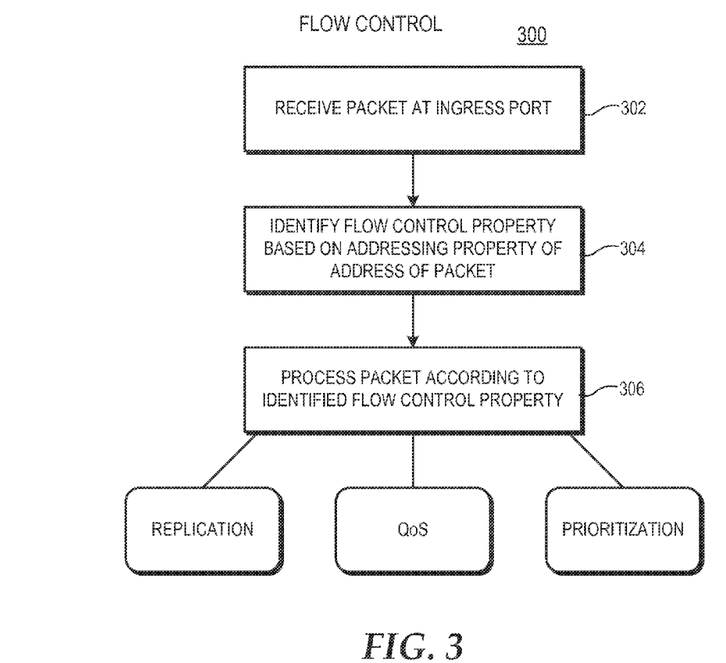
FIG. 3 is a flow diagram illustrating a method for controlling a data flow within a switching fabric based on flow metadata represented by selected virtual network interface addressing in accordance with at least one embodiment of the present disclosure.

FIG. 3 illustrates a method 300 for conducting a data flow at a switching fabric using address-indicated flow control metadata in accordance with at least one embodiment of the present disclosure. For ease of description, the method 300 is described in the context of the processing system 100 of FIG. 1. The method 300 initiates at block 302, wherein the switching fabric 106 receives a packet of a data flow at an ingress port. The packet includes a source address identifying the VNIC sourcing the packet and a destination address identifying the VNIC to which the packet is to be delivered. At block 304, the flow control logic 128 accesses the addressing information of the packet to identify the flow control properties to be applied to the transport of the packet within the switching logic 126. In one embodiment, the flow control properties for the packet are determined by identifying one or both of the source address and the destination address as having a defined addressing property and then performing a lookup in the data structure 131 based on the identified addressing property to identify the corresponding flow control property. Alternatively, the flow control logic 128 can run through each flow control property listed in the data structure 131 to determine whether the address(es) have the corresponding addressing property.

With the flow control properties for the data flow so identified, at block 306 the flow control logic 128 configures the switching logic 126 to implement flow control mechanisms to provide the flow control properties for the packet. As noted above, these flow control mechanisms can include packet replication, whereby the flow control logic 128 configures the switching logic 126 to copy an incoming packet and send the two copies of the packet over separate links between the ingress port and egress port. The flow control mechanisms also can include, for example, implementation of a QoS mechanism, such as selection of a high-bandwidth link, a high-reliability link, or a low-latency link, for transporting the packet. As another example, the flow control mechanism can include a prioritization mechanism whereby the packet may be placed in higher-priority queues or buffers (or, alternatively, lower-priority queues or buffers) as it is transported through the switching logic 126.

In one embodiment, the process of blocks 302, 304, and 306 is repeated for each packet of the flow, such that the flow control properties are determined on a per-packet basis. Alternatively, flow control logic 128 configures the switching logic 106 so that the flow control mechanisms are persistent for the data flow—that is, the switching logic 126 is configured to maintain the flow control mechanisms for the duration of the data flow on a per-flow basis, rather than performing the addressing property analysis and flow control property identification process of blocks 304 and 306 for each packet received for the data flow.

Figure 4:
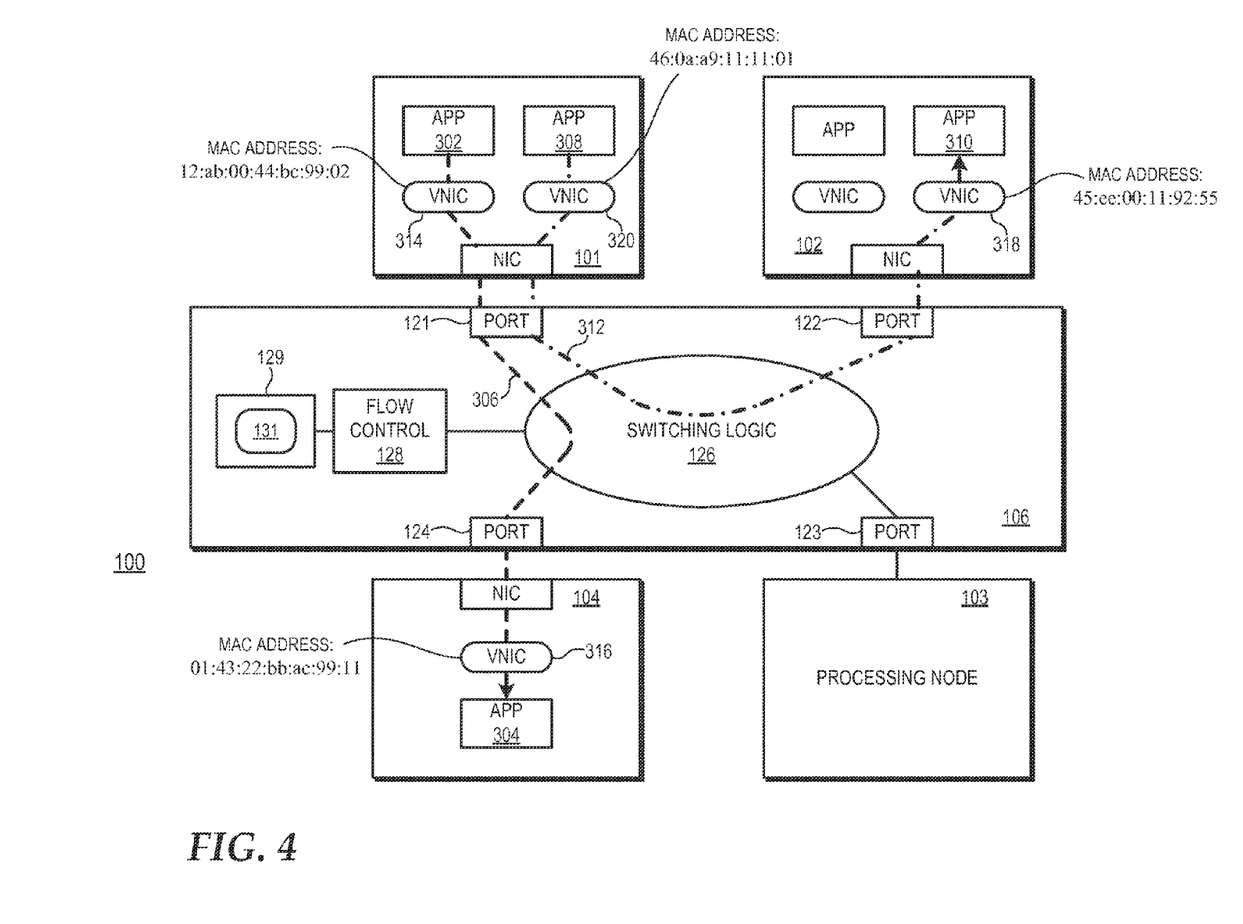
FIG. 4 is an example operation of the multiple-node processing system of FIG. 1 in accordance with the methods of FIGS. 2 and 3.

FIG. 4 illustrates an example operation of a processing system 100 in accordance with the methods 200 and 300 described above. In this example operation, an application 302 at the processing node 101 and the application 304 at the processing node 104 are involved in a data flow 306, and an application 308 at the processing node 101 and an application 310 at the processing node 102 are involved in a data flow 312. The data structure 1331 for this example employs the mappings indicated by Table 2 below:

TABLE 2

| FLOW CONTROL PROPERTY | MAC ADDRESSING PROPERTY |
|---|---|
| High priority | Source address has even MAC address |
| Replication | Source AND destination address each = XX:XX:XX:XX:99:XX |
| QoS – low-latency link | Destination Address: XX:XX:XX:XX:XX:XX:[1][0] – sum of numerals at positions [0] and [1] = 10 |

In this example, the applications 302 and 304 intend for the data flow 306 to be transmitted with high priority and with replication. In accordance with the mapping indicated by Table 2, these flow control properties are signaled when the source MAC address is an even MAC address (high priority) and both the source and destination MAC addresses have the digits of "99" at their second octet. Accordingly, the application 302 instantiates a VNIC 314 with a MAC address that is both even and has the digits "99" at the second octet, such as a MAC address of 12:ab:00:44:bc:99:02, and the application 304 instantiates a VNIC 316 with the digits "99" at the second octet, such as a MAC address of 01:43:22:bb:ac:99:11. Accordingly, packets generated by the application 302 for the data flow 306 are assigned a source MAC address of 12:ab:00:44:bc:99:02 and a destination MAC address of 01:43:22:bb:ac:99:11. Upon receiving these packets at the port 121, the flow control logic 128 determines that the packets for the data flow 306 have high priority and are to be replicated in response to identifying that the source and destination MAC addresses have the addressing properties identified above, and the flow control logic 128 configures the switching logic 126 accordingly.

Also in this example, the applications 308 and 310 intend for the data flow 312 to be transported via a low-latency link of the switching fabric 106. Accordingly, in accordance with the mapping indicated by Table 2 above, the application 310, as destination of the data flow 312, instantiates a VNIC 318 with a MAC address for which the sum of the numerals at the first two 4-bit numeral positions is equal to 10, such as 45:ee:00:11:92:55. The application 308, as the source of the data flow 312, instantiates a VNIC 320 with a MAC address that does not invoke an unintended flow control property, such as 46:0a:a9:11:11:01. As such, packets generated by the application 308 for the data flow 312 are assigned a source MAC address of 46:0a:a9:11:11:01 and a destination MAC address of 45:ee:00:11:92:55. Upon receiving these packets at the port 121, the flow control logic 128 determines that the packets for the data flow 312 are to be communicated via a low-latency link in response to identifying that the first two octets of the destination MAC address sum to 10, and the flow control logic 128 configures the switching logic 126 accordingly.

Figure 5:
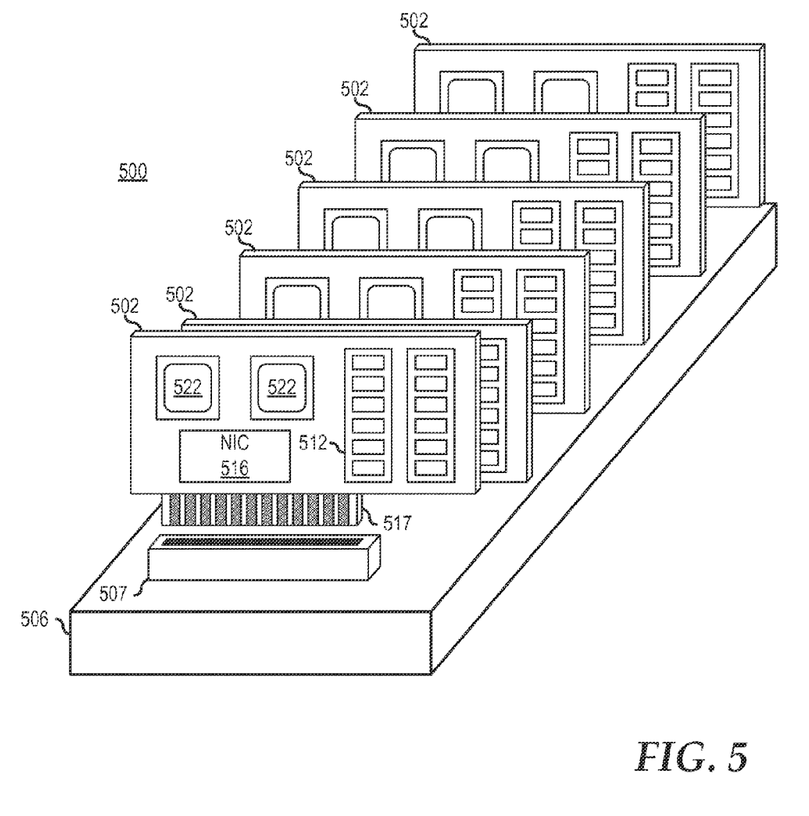
FIG. 5 is a diagram illustrating a processing system implementing a switching fabric in the form of an interconnect and a plurality of processing nodes in the form of field replaceable units (FRUs) in accordance with at least one embodiment of the present disclosure.

FIG. 5 illustrates an implementation of the processing system 100 as a server system 500 in accordance with at least one embodiment of the present disclosure. The server system 500 includes an Ethernet-based interconnect 506 (one embodiment of the switching fabric 106 of FIG. 1) and one or more plug-in sockets 507. Each plug-in socket 507 operates to connect one or more field replaceable units (FRUs) 502 (one embodiment of a processing node) into the interconnect 506. The interconnect 506, in turn, utilizes an Ethernet-based network, including one or more Ethernet-based switches, to implement point-to-point links among the one or more FRUs. The FRU 502 can be operated as a stand-alone computer within the processing system 500, as a virtualizable resource of a virtual machine manager implemented on the processing system 500, or as a parallel computing capability associated with a high performance computing system.

In the depicted example, the FRU 502 includes one or more processor cores 510 connected to a NIC 516 and one or more memory components 512 (e.g., system random access memory (RAM)), whereby one or more memory devices components 512 comprise a computer readable medium storing executable instructions that manipulate the one or more processor cores 510 to implement the functionality attributed herein to a processing node. FRU 502 further includes a socket interface 517 that connects the FRU 502 to the plug-in socket 507 of the interconnect 506. In at least one embodiment, the interconnect 506 implements flow control logic to implement various flow control mechanisms for data flows communicated between the FRUs 502 based on the flow control metadata signaled by the addresses selected for the VNICs instantiated for the data flows, as described above.

In at least one embodiment, the apparatus and techniques described above are implemented in a system comprising one or more integrated circuit (IC) devices (also referred to as integrated circuit packages or microchips), such as the components of the processing nodes 101-104 and the switching fabric 106 of the processing system 100 or the interconnect 506 and the FRUs 502 of FIG. 5. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
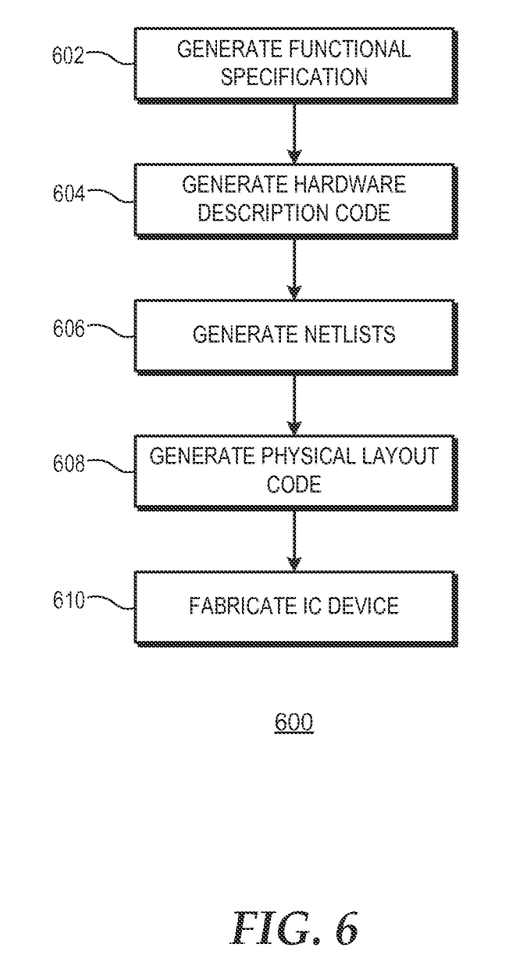
FIG. 6 is a flow diagram illustrating a method for designing and fabricating an integrated circuit device implementing at least a portion of a component of a processing system in accordance with at least one embodiment of the present disclosure.

FIG. 6 is a flow diagram illustrating an example method 600 for the design and fabrication of an IC device implementing one or more aspects of the present invention in accordance with at least one embodiment of the present disclosure. As noted above, the code generated for each of the following processes is stored or otherwise embodied in computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. In at least one embodiment, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In one embodiment, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 906 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. In a processing system comprising a plurality of processing nodes coupled via a switching fabric, a method comprising:
   implementing a flow control property for a data flow in the switching fabric based on an addressing property of an address of a virtual network interface controller associated with the data flow.

2. The method of claim 1, wherein implementing the flow control property comprises:
   accessing, at the switching fabric, the address from an address field of a packet associated with the data flow;
   identifying, at the switching fabric, the flow control property in response to identifying the accessed address as having the addressing property; and
   implementing the flow control property for transporting the packet between ports of the switching fabric.

3. The method of claim 2, wherein:
   the virtual network interface controller comprises a virtual network interface controller associated with a source of the data flow; and
   the address field comprises a source address field.

4. The method of claim 2, wherein:
   the virtual network interface controller comprises a virtual network interface controller associated with a destination of the data flow; and
   the address field comprises a destination address field.

5. The method of claim 1, further comprising:
   identifying, at a processing node of the plurality of processing nodes, the flow control property to be implemented for the data flow;
   identifying the addressing property associated with the identified flow control property;
   selecting the address based on the identified addressing property; and
   instantiating the virtual network interface controller with the selected address at the processing node.

6. The method of claim 5, wherein the switching fabric identifies the addressing property and selects the address.

7. The method of claim 1, wherein the flow control property comprises at least one of: a flow priority; a bandwidth property; a throughput property; an error rate property; a jitter property; and a replication property.

8. The method of claim 1, wherein the addressing property comprises at least one of: a parity of the digits of at least a subset of the numeral positions of the address; the address being in a specified address range; a specified digit at a specified numeral position of the address; a specified set of one or more digits at a specified subset of one or more numeral positions of the address; and a result of an arithmetic or logical operation using digits of at least a subset of the numeral positions of the address.

9. The method of claim 1, wherein the address comprises one of a media access control (MAC) address or an Internet Protocol (IP) address.

10. In a processing system comprising a plurality of processing nodes coupled via a switching fabric, a method comprising:
    identifying, at a processing node of the plurality of processing nodes, an addressing property associated with a flow control property to be implemented for a data flow;
    selecting an address based on the identified addressing property; and
    instantiating a virtual network interface controller with the selected address at the processing node.

11. The method of claim 10, further comprising:
assigning the address to a packet of the data flow; and
providing the packet to the switching fabric for transmission.

12. The method of claim 10, wherein identifying the addressing property comprises:
indexing a table based on the flow control property, the table representing mappings between addressing properties and flow control properties.

13. The method of claim 10, wherein the flow control property comprises at least one of: a flow priority; a quality-of-service property; a bandwidth property; a throughput property; an error rate property; a jitter property; and a replication property.

14. The method of claim 10, wherein the addressing property comprises at least one of: a parity of the digits of at least a subset of the numeral positions of the address; the address being in a specified address range; a specified digit at a specified numeral position of the address; a specified set of one or more digits at a specified subset of one or more numeral positions of the address; and a result of an arithmetic or logical operation using digits of at least a subset of the numeral positions of the address.

15. A switching fabric comprising:
a plurality of ports, each port configured to couple to a corresponding processing node;
switching logic coupled to the plurality of ports; and
flow control logic to implement a flow control property for a data flow in the switching logic based on an addressing property of an address of a virtual network interface controller associated with the data flow.

16. The switching fabric of claim 15, wherein the flow control logic is to implement the flow control property by:
accessing the address from an address field of a packet associated with the data flow;
identifying the flow control property in response to identifying the accessed address as having the addressing property; and
controlling processing of the packet by the switching logic based on the identified flow control property.

17. The switching fabric of claim 15, further comprising:
a memory to store a data structure representing mappings between addressing properties and flow control properties; and
wherein the switching fabric is to identify the flow control property by accessing the data structure responsive to identifying the addressing property.

18. The switching fabric of claim 15, wherein the addressing property comprises at least one of: a parity of the digits of at least a subset of the numeral positions of the address; the address being in a specified address range; a specified digit at a specified numeral position of the address; a specified set of one or more digits at a specified subset of one or more numeral positions of the address; and a result of an arithmetic or logical operation using digits of at least a subset of the numeral positions of the address.

19. The switching fabric of claim 15, wherein the flow control property comprises at least one of: a flow priority; a bandwidth property; a throughput property; an error rate property; a jitter property; and a replication property.

20. A processing system comprising the switching fabric of claim 15, the processing system further comprising a processing node coupled to a port of the plurality of ports, wherein the processing node is to:
identify the flow control property to be implemented for the data flow;
identify the addressing property based on the identified flow control property;
select the address based on the identified addressing property; and
instantiate the virtual network interface controller with the selected address at the processing node.

21. The processing system of claim 20, wherein the addressing property comprises at least one of: a parity of the digits of at least a subset of the numeral positions of the address; the address being in a specified address range; a specified digit at a specified numeral position of the address; a specified set of one or more digits at a specified subset of one or more numeral positions of the address; and a result of an arithmetic or logical operation using digits of at least a subset of the numeral positions of the address.

22. The processing system of claim 21, wherein the flow control property comprises at least one of: a flow priority; a bandwidth property; a throughput property; an error rate property; a jitter property; and a replication property.

23. The processing system of claim 22, wherein:
the switching fabric comprises an interconnect; and
the plurality of processing nodes comprise field replaceable units (FRUs) connected to the interconnect.

24. A processing node comprising:
a network interface controller configured to couple to a switching fabric;
a processor coupled to the network interface; and
a memory coupled to the processor, the memory storing a set of instructions to manipulate the processor to:
identify an addressing property associated with a flow control property to be implemented for a data flow to be communicated via the switching fabric;
select an address based on the identified addressing property; and
instantiate a virtual network interface controller with the selected address at the processing node.

25. The processing node of claim 24, wherein the set of instructions further is to manipulate the processor to:
assign the address to a packet of the data flow; and
provide the packet to the switching fabric for transmission.

26. The processing node of claim 24, further comprising a memory to store a data structure representing mappings between addressing properties and flow control properties, and wherein the set of instructions is to manipulate the processor to identify the addressing property by:
accessing the data structure based on a representation of the flow control property.

27. The processing node of claim 24, wherein:
the flow control property comprises at least one of: a flow priority; a bandwidth property; a throughput property; an error rate property; a jitter property; and a replication property; and
the addressing property comprises at least one of: a parity of the digits of at least a subset of the numeral positions of the address; the address being in a specified address range; a specified digit at a specified numeral position of the address; a specified set of one or more digits at a specified subset of one or more numeral positions of the address; and a result of an arithmetic or logical operation using digits of at least a subset of the numeral positions of the address.

* * * * *